INDUCTIVE D.-C. SETTING AND CLAMPING CIRCUIT ARRANGEMENTS

Filed Dec. 1, 1954 2 Sheets-Sheet 1

INVENTORS
GEORGE C. SZIKLAI
& ROBERT D. LOHMAN
BY [signature]
ATTORNEY

INDUCTIVE D.-C. SETTING AND CLAMPING CIRCUIT ARRANGEMENTS

Filed Dec. 1, 1954 2 Sheets-Sheet 2

INVENTORS
GEORGE C. SZIKLAI
& ROBERT D. LOHMAN
[signature]
ATTORNEY

1

2,912,597

INDUCTIVE D.-C. SETTING AND CLAMPING CIRCUIT ARRANGEMENTS

George Clifford Sziklai and Robert Douglas Lohman, Princeton, N.J., assignors to Radio Corporation of America, a corporation of Delaware Application December 1, 1954, Serial No. 472,500

10 Claims. (Cl. 307—88.5)

The invention relates to circuit arrangements for translating a signal having a varying unidirectional component, and it particularly pertains to simple circuitry for setting or clamping such a signal to a predetermined level and thereby restoring the direct current (D.-C.) component.

In some electric wave transmission systems, notably those for transmitting television image reproducing signals and those telemetering systems transmitting data represented by discrete amplitude levels between recurring fixed amplitude synchronizing pulses, the D.-C. component necessary to accurately reconstruct the desired intelligence is lost when these signals are passed through A.-C. coupled circuits. Examples of such A.-C. coupling devices are the capacitor and the transformer. In such arrangements it is necessary to re-insert or restore the D.-C. component and a number of circuit arrangements for so doing are known. Most, if not all, of the known circuit arrangements are more efficient when working from a low impedance source to a high impedance load, which condition is encountered between stages of vacuum tube amplifiers. Electrical wave amplifying systems using transistors or other semiconductive devices require a D.-C. setting or clamping circuit which works better from a high impedance source into a low impedance load.

An object of the invention is to provide an improved coupling circuit suitable for D.-C. setting or clamping particularly applicable to circuits having a high impedance source working into a low impedance load.

A more specific object of the invention is to provide a circuit arrangement for maintaining a direct correspondence between a given current through a load device and a predetermined level of the electric wave, for example the black level of a composite video frequency wave.

The objects of the invention are attained in a circuit arrangement comprising a high impedance source of electric waves coupled to a low impedance load element wherein an inductive reactance element is coupled across the connections to the high impedance source, and a switching device is interposed between the high impedance source and the low impedance load element to disconnect the latter from the former at a predetermined time. The switching device is arranged to be opened during a predetermined portion of the signal wave, for example, the back porch interval of a composite video signal, and to be closed during remainder of the signal, that is during the picture portion of the signal in the example given. The current flowing through the inductive reactance element tends to continue to flow when the switching device is closed and thus the predetermined level as determined by the current flowing through the inductive reactance element during the open-switch time maintains the predetermined D.-C. level in the circuit arrangement.

In order that the practical aspects of the invention may be more fully appreciated and applied to practical circuit arrangements, several express embodiments are described, by way of example only, with reference to the accompanying drawing in which:

2

Figure 1:
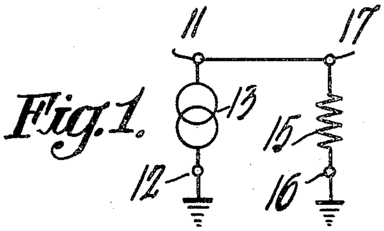
Fig. 1 is a schematic diagram of a basic electric circuit useful in explanation of the invention.
Figure 3:
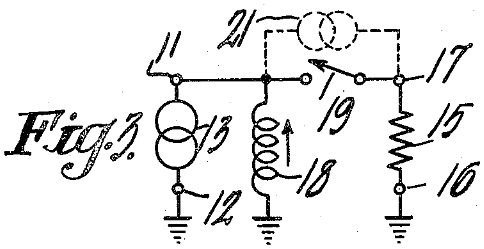
Fig. 3 is a schematic diagram of a basic electric circuit according to the invention.
Figure 2:
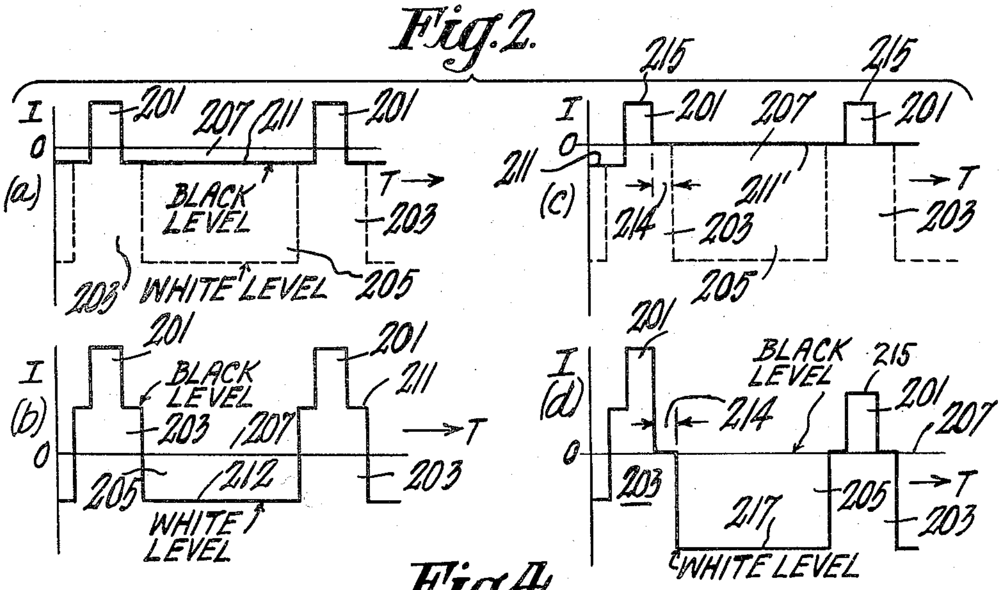
Fig. 2 is a graphical representation of waveforms useful in an explanation of the circuit arrangements according to the invention.

The basic principles of the circuit arrangements according to the invention are illustrated by Figs. 1–3. Referring to Fig. 1, an electric wave signal appearing across a pair of terminals 11, 12 from some conventional source, shown here as a constant current generator 13 is applied to a load element 15 between a pair of input terminals 16, 17. The impedance of the load element 15 is relatively low compared to the impedance at the terminals 11, 12 of the constant current generator 13 so that for all intents and purposes the load element 15 represents a short circuit across the generator 13.

Referring to Fig. 2, the effect of the loss of the D.-C. component of a television signal is graphically portrayed. The curves of Fig. 2 represent a television signal having the conventional synchronizing pulses 201 superimposed on pedestals 203 between which there are picture signal information portions 205.

In Fig. 2(*a*) the picture signal information is represented by the line 211 which is at the black level throughout the picture line and slightly below the zero current reference line 207. The broken line indicates the relative location of white level signals. With the generator 13 presenting a wave as shown in Fig. 2(*a*) across the input terminals 16, 17 of the low impedance load element 15, the current through the load element 15, which is essentially a short circuit will fall to zero. On reference to Fig. 2(*a*) it will be seen that this level corresponds to a level somewhat blacker-than-black. In Fig. 2(*b*) the picture information is represented by the line 212 which for the purpose of illustration, is maintained at the white level throughout the picture line. It is seen that if the generator 13 of Fig. 1 develops an electric wave of the form shown in Fig. 2(*b*) the current through the essentially short circuit load impedance element 15, as represented by the zero current line 207 is now approximately midway between the white and black levels. The bias on the kinescope of a television receiver is customarily set to cut off the electron beam at the black level. Under the conditions represented by the curve Fig. 2(*b*) the electron beam would not be of sufficient intensity to make the picture line appear white but only roughly halfway between black and white, or gray. In order to accurately reproduce an image it is necessary to maintain a direct relation between a given current in the load element 15 and black level of the picture information portion 205 of the composite video signal.

In Fig. 3 an inductor or inductive reactance element 18 of high impedance with respect to the impedance of the load element is shunted across the terminals 11, 12 and a switching device 19 is interposed between the ungrounded terminals 11 and 17 to selectively connect the load element 15 across the inductor or inductive reactance element 18. For the condition represented by the curve in Fig. 2(*c*) the constant current generator 13 applies all black picture line information as represented by the line 211 producing current flow in the inductive reactance element 18 (which is flowing in the direction of the arrow). The switching device 19 is arranged to be open during a given fixed-level portion, preferably the back porch interval 214, of the electric wave signal although the tips of the pulses 201 may be used since the tip level bears a fixed relationship to the back porch level. During the time the switching device 19 is open there is no current flowing in the load element 15. During the picture portion of the signal as represented by the line 211 the switching device 19 is closed. The inductive reactance element 18 is then effectively short-circuited by the relatively low impedance of the load element 15. At a result there is still zero current in the short circuit impedance of the load element 15 and the picture black level, as represented by the line 211, now coincides with the zero current level, represented by the line 207. This value is arranged to correspond to cutoff of the image reproducing device or kinescope. For the condition wherein the picture information is that of a continuous white line as represented by the curve portion 217 in Fig. 2(*d*) the constant current generator 13 establishes a current in the inductive reactance element 18 during the back porch interval 214 (which current is flowing in the direction opposite to the arrow). When the switching device 19 is closed the inductive reactance element continues to draw this same value of current from the constant current generator 13 and thus maintains black level in the effectively short circuit load impedance 15 at zero current. During operation the succeeding pulses will be clamped as is shown for the second pulse in Fig. 2(*d*). The proper relationship will therefore be maintained for all values of picture signal intermediate the black and white levels.

Figure 4:
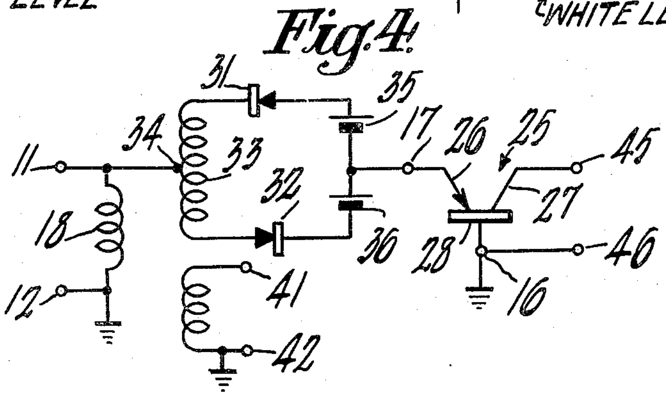
Figs. 4–7 are practical embodiments of circuit arrangements according to the invention.

A practical circuit arrangement is shown in Fig. 4 wherein the load element is formed by the input circuit of a controlled electron flow path device shown here in the form of a transistor 25, comprising an input circuit electrode or emitter 26, an output circuit electrode or collector 27 and a common circuit electrode or base 28. The collector 27 is maintained at a potential negative with respect to that on the base 28 by suitable means (not shown) such as that shown below in connection with Fig. 7 in order to properly energize the circuit arrangement. An input circuit of low impedance is found between the electron flow controlling or input circuit electrode 26 and the common circuit base electrode 28. The switching device in Fig. 4 is constituted by a pair of unilaterally conducting devices 31, 32 which are connected to the input terminal 11 by means of a coil 33 having two end terminals to which the unilaterally conducting devices 31, 32 are connected and an intermediate tap 34. Two cells 35, 36 are connected to the normally open switching devices 31, 32 to bias them conducting, effectively closing them, and thereby present a low impedance to the signal between the generator terminals 11, 12 and the load terminals 17, 16. A drive or keying pulse, synchronized with the back porch interval of a television signal, or other portion of an electric wave signal as desired, is applied between the keying pulse terminals 41, 42. The keying pulse terminals are connected to a winding 43 which is inductively coupled to the winding 33. The keying pulse is of sufficient amplitude to induce a potential in the winding 33 to drive the unilaterally conducting devices 31, 32 in the back direction and effectively open the switching device. The clamped output signal is obtained at the output terminals 45, 46 connected to the collector electrode 27 and the base 28 respectively.

Figure 5:
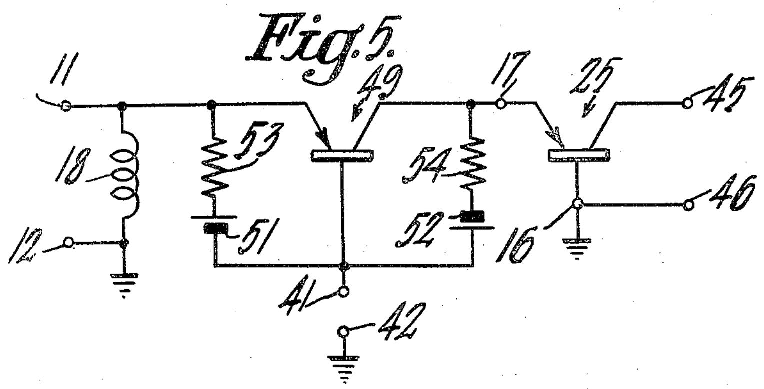

Another embodiment of the invention is shown in Fig. 5 wherein the switching device is constituted by a controlled electron flow path device shown here in the form of a transistor 49. By means of batteries 51 and 52 energizing potentials are applied between the base and the emitter and between the base and the collector through the resistors 53 and 54, respectively. The batteries 51 and 52 and the resistors 53 and 54 have values at which the transistor device 49 is rendered normally conducting. A positive going keying pulse applied at the keying pulse terminals 41, 42 effectively opens the switching device during the back porch, or other desired keying, interval.

Figure 6:
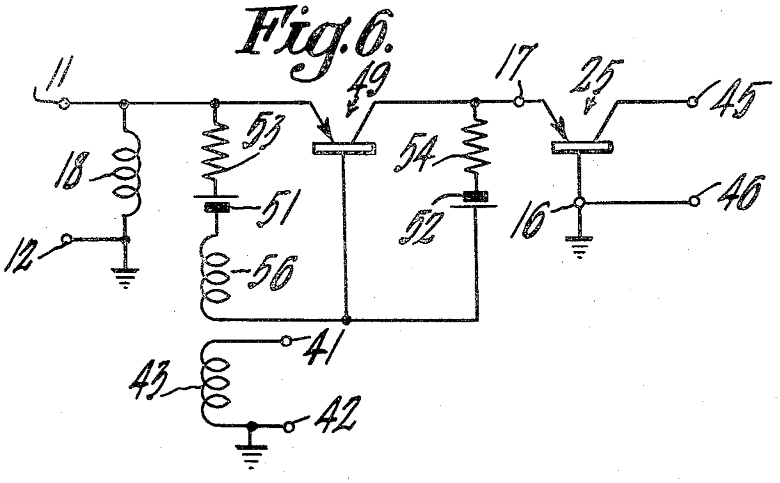

A different keying arrangement is shown in Fig. 6 wherein there is a winding 56 interposed in the connections between the base and emitter of the transistor 49. This winding 56 is inductively coupled to the keying pulse winding 43. A negative going pulse is induced in the winding 53 to cut the transistor device off during the back porch, or other desired keying, interval. The electric wave to be clamped is applied across the generator terminals 11, 12 and the clamped wave is derived at the output terminals 45, 46.

Figure 7:
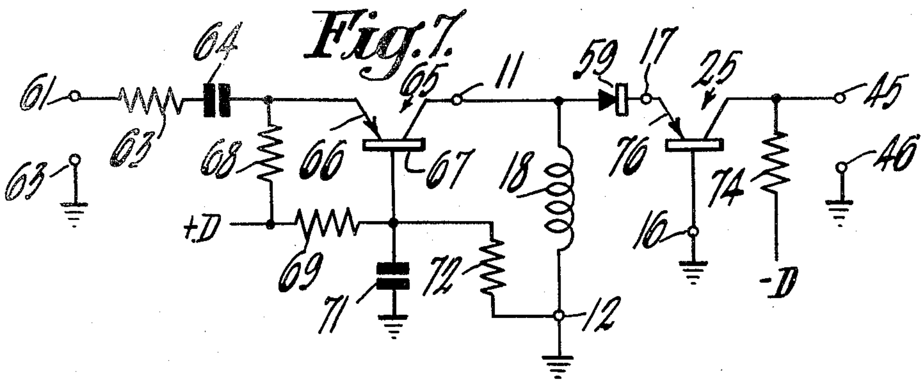

In the embodiments described above, the switching device has been synchronized with the desired portion of the input electric wave. It is convenient, however, with television signals to make use of the fact that synchronizing pulses represent the extreme value of the signal in one direction and a direct current level setting circuit utilizing this fact is shown in Fig. 7. The arrangement of Fig. 7 comprises a voltage operated switching device 59 and sets on the synchronizing pulse tips rather than on the back porch level. Since there is a fixed relationship between the synchronizing pulse tips and the back porch or black level as set at the transmitter, this type of D.-C. setting or clamping circuit will suffice for most receiver applications. In Fig. 7 the electric wave containing video signal components is applied between the input terminals 61, 62. The signal is applied to the input circuit of a transistor 65 through a resistor 63 and an A.-C. coupling device, in the form of a capacitor 64. Positive energizing potentials are applied to the emitter 66 and the base 67 through resistors 68 and 69 respectively. The base is connected to a point of fixed reference potential or ground through a capacitor 71 and a base resistor 72. Negative potential is applied to the collector of the load element transistor 25 by means of a resistor 74. The diode switching device 59 may be omitted where the reverse voltage rating of the emitter 76 is not exceeded by the voltage kick across the inductive reactance element 18.

While the previously described practical examples of circuit arrangements according to the invention have been limited to the input circuit of a transistor or the load element, it should be understood that the circuit arrangement according to the invention may have a low impedance load element comprising the input circuit of any type of controlled electron flow path device under appropriate conditions. A vacuum tube might be used, for example, a cathode input type circuit using either a special tube having a very low impedance input circuit or a plurality of conventional tubes connected in parallel to provide an extremely low impedance input circuit. For clamping on a maximum rather than the minimum swing of a signal, for instance, the white level of a composite video signal, one skilled in the art would choose to use a junction transistor of the proper polarity in accordance with the conditions prevailing and so on. The point-contact transistor might be used, if deemed desirable, in circuit configurations having the device properly energized to suit the conditions.

The component parts values listed below were used in a circuit arrangement built along the lines indicated by Fig. 7 and successfully tested in connection with a video frequency amplifier for a television receiver application.

| Ref. No. | Component | Type or value |
|---|---|---|
| 18 | Inductance element | 50 millihenries. |
| 25 | Transistor load element | 2N34. |
| 59 | Switching diode | 1N34. |
| 63 | Series resistor | 750 ohms. |
| 64 | Coupling capacitor | 2.0 microfarads. |
| 65 | Amplifier transistor | 2N34. |
| 68 | Biasing resistor | 5.1 kilohms. |
| 69 | Biasing resistor | 16 kilohms. |
| 71 | Base capacitor | 50 microfarads. |
| 72 | Base resistor | 6.2 kilohms. |
| 74 | Collector resistor | 6.2 kilohms. |

A power supply delivering a potential of 22½ volts positive was connected between the point marked plus D and ground and another supply delivering a potential of 22½ volts negative was connected between ground and a point labeled minus D. Obviously, those skilled in the art will suggest other values of the components for other applications of the invention.

The invention claimed is:

1. An electric wave clamping circuit arrangement including a controlled electron flow path device having an input circuit electrode, an output circuit electrode and a common circuit electrode, said electric wave having regularly recurring portions, an inductive reactance element having one terminal connected to said common circuit electrode, a unilateral impedance device having a terminal connected to the other terminal of said inductive reactance element and another terminal connected to the input circuit electrode of said controlled electron flow path device, means to continuously apply the electric wave to be clamped across said inductive reactance element, means associated with said unilateral impedance for blocking current flow therethrough during said recurring portions of said electric wave thereby to clamp said electric wave, and means to derive the clamped wave between said output and common circuit electrodes.

2. An electric wave translating circuit arrangement including a transistor having an emitter, collector and a base, an inductive reactance element having one terminal connected to said base, a transformer comprising one winding having a tap connected to the other terminal of said inductive reactance element and another winding, unilateral impedance devices connected to the terminals of said one winding and connected together to the emitter of said transistor, means to apply the electric wave to be clamped across said inductive reactance element, means to apply a pulse wave across said other winding to activate said circuit arrangement during the pulse interval to clamp said electric wave, and means to derive the clamped wave between said collector and said base.

3. An electric wave translating circuit arrangement including an inductive reactance element, a transistor having an emitter connected to a terminal of said inductive reactance element, a collector and a base, a low impedance load element having a terminal connected to said collector, a transformer comprising one winding having a terminal connected to the base, and another terminal coupled to the emitter of said transistor and another winding, means to apply the electric wave to be clamped across said inductive reactance element, means to apply a pulse wave to said other winding to activate said circuit during the pulse interval to clamp said electric wave, and means to derive the clamped wave between said collector and said base.

4. A video frequency wave translating circuit arrangement, including a transistor having an emitter, a base and a collector, input terminals capacitively coupled between said emitter and a point of fixed reference potential, a resistor connecting said emitter to a point of positive energizing potential, means connecting said base to said point of fixed reference potential, an inductive reactance element connected between said collector and said point of fixed reference potential, another transistor having a base connected to said point of fixed reference potential, an emitter and a collector, each of said transistors being of the same conductivity type a diode coupling said emitter to the collector of the first said transistor, and a resistor connecting the collector of said other transistor to a point of negative energizing potential.

5. A video frequency wave translating circuit arrangement, including a transistor having an emitter, a base and a collector, input terminals capacitively coupled between said emitter and a point of fixed reference potential, resistors connecting said emitter and said base to a point of positive direct current energizing potential, a resistor and a capacitor connected in parallel between said base and said point of fixed reference potential, an inductive reactance element directly connected between said collector and said point of fixed reference potential, said video wave having regularly recurring portions, a pair of output terminals, and a switching device for selectively coupling said output terminals across said inductive reactance element, said switching device including another transistor having a base connected to said point of fixed reference potential, an emitter and a collector, a diode device coupling said other transistor emitter to the collector of the first said transistor, and a resistor connecting the collector of said other transistor to a point of negative direct current energizing potential, said other transistor collector electrode being connected to one of said pair of output terminals.

6. A circuit arrangement for translating an electric wave having a recurring pulse component, including a low impedance load element in the form of the input circuit of a transistor, an inductive reactance element direct current connected across said input circuit of said transistor, another transistor having a collector direct current connected to one terminal of said inductive reactance element, a base and an emitter, a capacitor and a resistor connected in parallel between said base and the other terminal of said inductive reactance element, means to apply potentials to said emitter and said base to render the same positive with respect to said collector, and means to apply said electric wave between said emitter and the other terminal of said inductive reactance element.

7. An electric wave translating circuit arrangement, including an inductive reactance element, means to apply the electric wave to be translated across said inductive reactance element, a low impedance load element having one terminal connected to one terminal of said inductive reactance element, a transistor having a collector electrode connected to the other terminal of said low impedance load element, another electrode connected to the other terminal of said inductive reactance element and a further electrode, means to apply energizing potentials between said further and said other electrode and between said further and said collector electrodes, and means to apply a pulse wave between said further electrode and said other terminal of said inductive reactance element to activate said transistor during said pulse interval to clamp said electric wave as it appears in said load element.

8. A circuit arrangement for setting the direct current component of a composite electric wave having signal portions occurring in time between recurring pulse portions extending in one direction beyond the predetermined limits of said signal portion, including a high inductive reactance element, means to apply said composite electric wave across said inductive reactance element, a transistor having an input circuit with a substantially short circuit impedance to direct current, and means coupling said input circuit in parallel with said inductive reactance element only during said signal portions of said electric wave, thereby clamping the wave at said input circuit to a predetermined value.

9. An electric wave clamping circuit arrangement including a substantially high impedance inductive reactance element, means to apply the electric wave to be clamped across said inductive reactance element, said electric wave having recurring components, a load element normally coupled across said inductive reactance element and having an impedance relatively low with respect to that of said inductive reactance element, and means including a switching device synchronized with said recurring components of said electric wave to disconnect said load element from across said inductive reactance element during said recurring components.

10. An electric wave clamping circuit arrangement including a transistor having an emitter, collector and a base, an inductive reactance element having one terminal connected to said base, a unilateral impedance device having a terminal connected to the other terminal of said inductive reactance element and another terminal connected to the emitter of said transistor, said electric wave having regularly recurring portions, means to continuously apply the electric wave across said inductive reactance element, means associated with said unilateral impedance device for blocking current flow therethrough during said recurring portions of said electric wave thereby to clamp said electric wave by establishing a current flowing through said inductive reactance element proportional to the potential of said electric wave during said recurring portions, and means to derive the clamped wave between said collector and said base.

References Cited in the file of this patent

UNITED STATES PATENTS 2,422,064 Anderson et al. ........ June 10, 1947

2,543,445 Doolittle .............. Feb. 27, 1951
2,580,941 Morrison .............. Jan. 1, 1952
2,599,675 Volz ................. June 10, 1952
2,683,803 Keizer ................ July 13, 1954
2,744,198 Raisbeck .............. May 1, 1956
2,758,208 Grayson ............... Aug. 7, 1956
2,759,179 Kircher ............... Aug. 14, 1956
2,773,122 Dome .................. Dec. 4, 1956
2,773,220 Aron .................. Dec. 4, 1956
2,774,826 Moulon ................ Dec. 18, 1956
2,793,303 Fleisher .............. May 21, 1957